United States Patent [19]
Konzelmann

[11] Patent Number: 6,085,587
[45] Date of Patent: Jul. 11, 2000

[54] DEVICE FOR MEASURING THE MASS OF A FLOWING MEDIUM

[75] Inventor: Uwe Konzelmann, Asperg, Germany

[73] Assignee: Robert Bosch GmbH, Stuttgart, Germany

[21] Appl. No.: 09/051,408

[22] PCT Filed: Mar. 25, 1997

[86] PCT No.: PCT/DE97/00596

§ 371 Date: Apr. 9, 1998

§ 102(e) Date: Apr. 9, 1998

[87] PCT Pub. No.: WO98/07007

PCT Pub. Date: Feb. 19, 1998

[30] Foreign Application Priority Data

Aug. 9, 1996 [DE] Germany .............................. 196 32 198

[51] Int. Cl.[7] .............................. G01F 5/00; G01M 19/00
[52] U.S. Cl. ...................... 73/202; 73/861.22; 73/118.2; 73/204.21
[58] Field of Search ................................. 73/861.22, 202, 73/202.5, 204.21, 118.2

[56] References Cited

U.S. PATENT DOCUMENTS

| | | |
|---|---|---|
| 4,437,349 | 3/1984 | Joy . |
| 4,457,169 | 7/1984 | Laubertach et al. ................... 73/202.5 |
| 4,478,075 | 10/1984 | Oyama et al. .......................... 73/118.2 |
| 5,476,012 | 12/1995 | Takashima ............................. 73/202.5 |

FOREIGN PATENT DOCUMENTS

| | | |
|---|---|---|
| 3515206A1 | 4/1985 | Germany . |
| 4407209A1 | 3/1994 | Germany . |

Primary Examiner—Harshad Patel
Attorney, Agent, or Firm—Ronald E. Greigg; Edwin E. Greigg

[57] ABSTRACT

A device for measuring the mass of a flowing medium which avoids measuring liquid components entrained in the medium. The device includes an interrupting body, which is accommodated upstream of the device, in a section of an air intake line that tapers in the flow direction, in order to filter out liquid components entrained in the flow by means of the interrupting body and to divert the liquid components from the measuring device. The invention is provided for measuring the mass of a flowing medium, in particular for measuring the intake air mass of internal combustion engines.

14 Claims, 2 Drawing Sheets

DEVICE FOR MEASURING THE MASS OF A FLOWING MEDIUM

PRIOR ART

The invention is based on a device for measuring the mass of a flowing medium. A device has already been disclosed (DE-OS 35 15 206) in which a capture element is provided in the vicinity of a measuring element in a measurement conduit of the device in order to prevent the measuring element from capturing dirt particles present in the air flow. The given accommodation of the capture element in the vicinity of the measuring element produces a leeward area downstream of the capture element, which should prevent the measuring element from capturing dirt particles. Nevertheless, when liquid components are entrained in the air flow, a deposit on the measuring element can be produced, which leads to a disadvantageous alteration of the characteristic curve or the measurement precision of the device.

ADVANTAGES OF THE INVENTION

The device according to the invention for measuring the mass of a flowing medium, has the advantage over the prior art that the measuring element is prevented from capturing in particular liquid components from the air flow so that a uniformly precise measurement result can occur.

Advantageous improvements and updates of the device are possible by means of the measures taken herein. It has turned out that in particular a prismatic embodiment of an interrupting body advantageously produces a particularly effective diversion of liquid components entrained in the air flow. It is of particular advantage that a channel-shaped recess is provided on an end face of the prismatic interrupting body in which the liquid components can collect in order to then drip away in the direction of a wall of the intake line disposed opposite the device, without influencing the device.

BRIEF DESCRIPTION OF THE DRAWINGS

An exemplary embodiment of the invention is represented in a simplified form in the drawings and will be explained in detail in the description below.

DESCRIPTION OF THE EXEMPLARY EMBODIMENT

Figure 1:
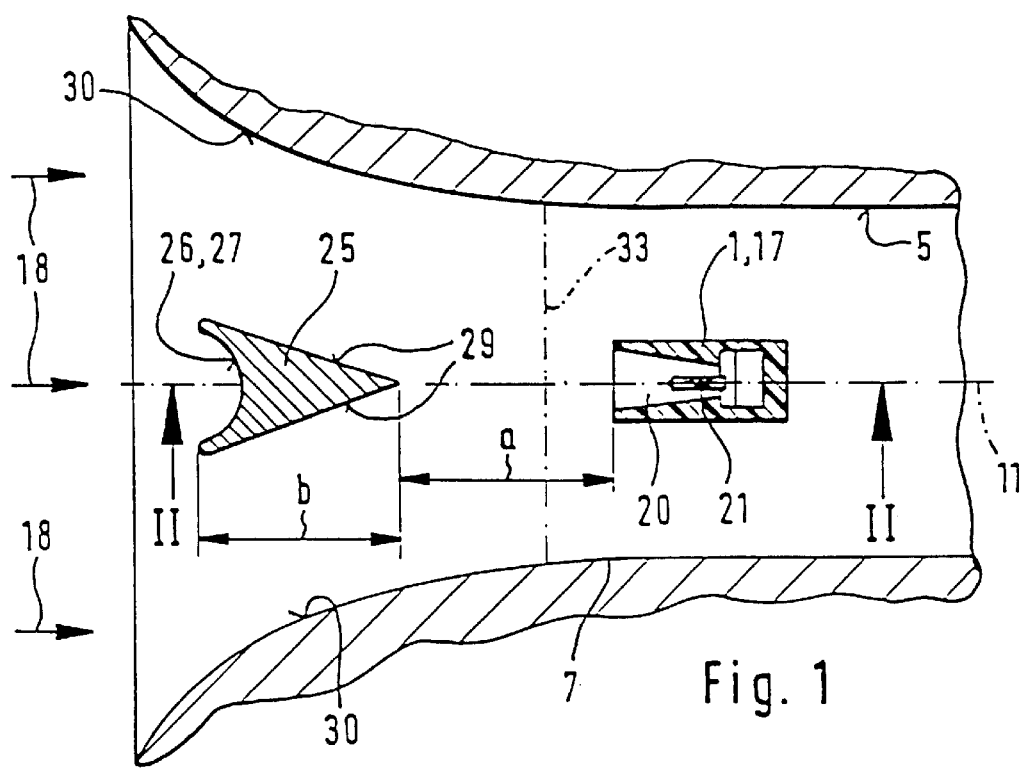
FIG. 1 shows a cross section through an intake line with a device and interrupting body accommodated in it.

FIG. 1 shows a cross section of a device identified with 1, which is used to measure the mass of a flowing medium, in particular the intake air mass of internal combustion engines. The internal combustion engine can be a mixture compressing engine with externally supplied ignition, or it can be an air compressing, self-igniting engine. As shown in more detail in FIG. 2, a longitudinal section along a line II—II in FIG. 1, the device 1 preferably has a slim, rod-shaped, block-like form that extends longitudinally in the direction of a plug axis 10, and is inserted, for example so that it can slide, into an opening 6 let into a wall 5 of an intake line 7 that constitutes a flow line. The wall 5 depicted with cross hatching is for example a part of cylindrically embodied intake line 7, through which a medium flows, in particular the air aspirated by the internal combustion engine. The wall 5 of the intake line 7 defines a flow cross section which in the instance of the cylindrical intake line 7 has a circular cross section, in the center of which a center axis 11 extends in the direction 18 of the flowing medium, parallel to the wall 5, and is oriented perpendicular to the slide axis 10. The direction of the flowing medium is indicated in FIGS. 1 and 2 by means of corresponding arrows 18 and runs from left to right there.

The device 1 protrudes into the flowing medium with a part called the measurement part 17 below. In the measurement part 17 of the device 1, a measurement conduit 20 is embodied in which a measuring element 21 is accommodated for measuring the medium flowing in the intake line 7. The design of a device 1 of this kind is sufficiently known by one skilled in the art, for example from DE-OS 44 07 209, whose disclosure should be a component of the current patent application.

Figure 2:
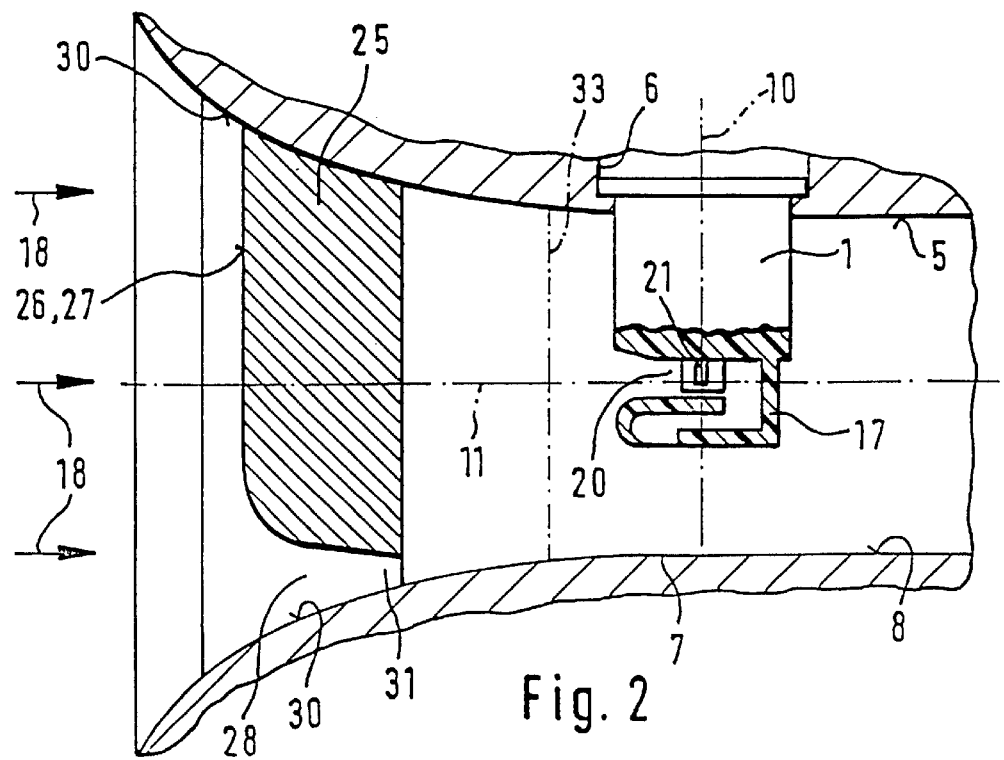
FIG. 2 shows a longitudinal section along a line II—II in FIG. 1, through the intake line with the device and interrupting body.

According to the invention, upstream of the device 1, an interrupting body 25 is accommodated in the intake line 7 and its shape is embodied so that components entrained in the flow 18 of the medium, in particular those in liquid form, are diverted away from the center of the intake line 7 indicated by the center axis 11 essentially to a lower part of the wall 5 that is represented at the bottom in FIG. 2 and is identified with the reference numeral 8. As shown in more detail in FIG. 1, the vertically disposed interrupting body 25 has a prismatic form for this purpose, with an essentially triangular cross sectional area, which is defined by two side faces 29 and an end face 26 that is disposed in opposition to the flow 18. A slightly concave arched, channel-shaped recess 27 is provided on the end face 26 oriented toward the flow 18 and liquid components disposed in the flow 18 can collect in this recess and then can flow in the channel-shaped recess 27 out toward the part 8 of the wall 5 that is disposed opposite the device 1 and is depicted at the bottom in FIG. 2, so that the liquid components are prevented from influencing the flow in the measurement conduit 20 of the device 1. The interrupting body 25 is accommodated in a section 30 of the intake line 7 that tapers down in a nozzle-shaped fashion in the flow direction 18 and reduces the cross section of the intake line 7. Preferably, the side faces 29 that lead from the end face 26 and approach each other in the flow direction 18 extend approximately parallel to the arched wall 5 of the section 30 of the intake line 7 and meet for example at the center axis 11. The section 30 of the intake line 7 that tapers in the flow direction 18 constitutes a convergent nozzle section in which an acceleration or an increase of the flow speed of the medium occurs. The embodiment of the interrupting body 25 is carried out in such a way that a flow around the interrupting body 25 occurs essentially without flow separations at this point. Fluid and solid particles cannot follow the deflection and in particular, fluid impurities collect in the channel-shaped recess 27 so that downstream of the interrupting body 25, these impurities are prevented from soiling the device 1 or the measuring element 21. The device 1 is accommodated in the intake line 7, downstream of the section 30 and downstream of an extremely narrow cross section 33 that adjoins the section 30. Preferably, the device 1 is accommodated in relative proximity to the interrupting body 25, wherein a distance a of the device 1 from the interrupting body 25, measured in the flow direction 18, corresponds approximately to one to three times the width b of the interrupting body 25, measured in the flow direction 18.

Figure 3:
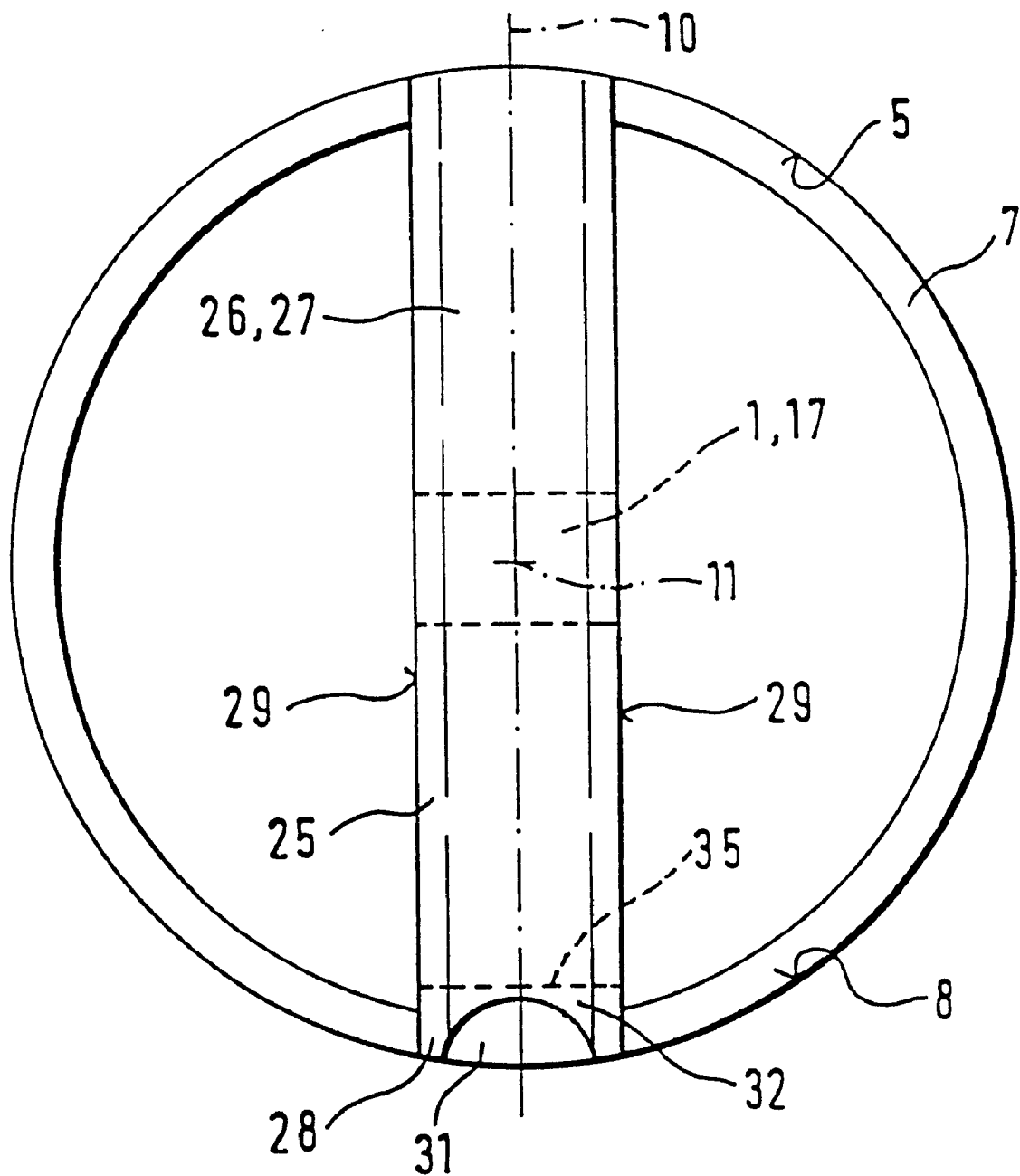
FIG. 3 shows a top view of the intake line with the interrupting body.

The interrupting body 25 extends parallel to and flush in the flow direction 18 to the slide axis 10 and therefore perpendicular to the center axis 11, from the upper wall 5 preferably to the lower part 8 of the wall 5. As shown in more detail in FIG. 3, a top view of the interrupting body 25 accommodated in the intake line 7, in the region of the lower part 8 of the wall 5, an opening 31 that extends in the flow direction 18 is let into the interrupting body 25. The opening 31, which is provided on the interrupting body 25, on an end 28 disposed opposite the opening 6 for the device 1, for example has a semicircular cross section which the fluid components collected in the channel-shaped recess 27 can flow out of once again, which are then transported away from the flow and in the course of this, through the influence of gravity, remain essentially in the region of the lower part 5 of the wall 8. It is also possible, though, to embody the interrupting body 25 from the upper wall 5 only until it reaches the vicinity of the lower part 8 of the wall 5 so that a gap 32, which is indicated with a dashed line 35 in FIG. 3, remains at the end 28 of the interrupting body 25 in relation to the lower part 8 of the wall 5, which the liquid components collected in the channel-shaped recess 27 can drip out of and toward the lower part 8 of the wall 5.

The rod-shaped interrupting body 25 is therefore disposed upstream of the device 1, which is likewise embodied as rod-shaped and protruding into the intake line 7, wherein at least the part of the measurement conduit 20 that extends approximately at the level of the center axis 11 is disposed, along with the measuring element 21, in the lee of the interrupting body 25. The interrupting body 25 and the device 1 extend for example parallel to each other through the center axis 11 of the intake line 7. The disposition of the interrupting body 25 in the section 30 that tapers in the flow direction 18 means that no whorls are produced due to variations in the boundary layer, which would lead to measurement errors in the device 1. For improved removal of deposits in the recess 27, the bottom of the recess 27 oriented downstream is inclined in the direction of the flow 18 and toward the end 28, and the opening 31 or the gap 32 tapers in the flow direction 18.

The foregoing relates to preferred exemplary embodiments of the invention, it being understood that other variants and embodiments thereof are possible within the spirit and scope of the invention, the latter being defined by the appended claims.

What is claimed is:

1. An airflow measuring device for measuring the mass of a flowing medium of the intake air flowing in an intake line of internal combustion engines, said airflow measuring device (1) protrudes into the intake flow line, said airflow measuring device includes a measuring element (21) for measuring the mass flowing in the intake flow line, upstream of the airflow measuring device (1) an interrupting body (25) is accommodated at a tapered air inflow section (30) of the intake flow line (7) on an axis (11), and said interrupting body has an upstream end face (26), beginning at the upstream end face (26) the interrupting body tapers in the airflow direction (18) of the medium from an air input end toward said airflow measuring device, and said interrupting body (25) is disposed totally with a width (b) in said tapered section (30) of the intake flow line (7) measured in the flow direction (18) of the air flow.

2. An airflow measuring device according to claim 1, in which the interrupting body (25) has a prismatic shape which extends to a point on the axis (11) in a direction of air flow.

3. An airflow measuring device according to claim 2, in which an airflow input end face (26) of the interrupting body (25) oriented toward the flow (18) has a concave channel-shaped recess (27).

4. An airflow measuring device according to claim 3, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

5. An airflow measuring device according to claim 2, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

6. An airflow measuring device according to claim 2, in which said tapered air flow section 30 of said inflow line has a surface which is substantially parallel with the prismatic surface of the interrupting device.

7. An airflow measuring device according to claim 1, in which the upstream end face (26) of the interrupting body (25) is oriented toward the air input flow (18) and has a concave channel-shaped recess (27).

8. An airflow measuring device according to claim 7, in which the interrupting body (25) is disposed vertically and on a lower end (28), said interrupting body has an opening (31) connected with the concave channel-shaped recess (27).

9. An airflow measuring device according to claim 8, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

10. An airflow measuring device according to claim 7, in which the interrupting body (25) is disposed vertically with an upper end connected to an inner face of said intake flow line and a lower end (28) of said interrupting body is spaced from a lower part (8) of a wall (5) of the flow line (7) by a gap (32).

11. An airflow measuring device according to claim 5, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

12. An airflow measuring device according to claim 7, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

13. An airflow measuring device according to claim 1, in which the interrupting body (25) is accommodated in relative proximity to the airflow measuring device (1), wherein a distance (a) of the airflow measuring device (1) from the interrupting body (25), measured in the flow direction (18), corresponds approximately from about one to three times width (b) of the interrupting body (25), measured in the flow direction (18).

14. An airflow measuring device according to claim 1, in which said tapered air flow section (3) of said inflow line has a surface which is substantially parallel with the prismatic surface of the interrupting body.

* * * * *